United States Patent
Soteropulos

[15] 3,680,291
[45] Aug. 1, 1972

[54] CORN HARVESTING MACHINE
[72] Inventor: Gust Soteropulos, Ottumwa, Iowa
[73] Assignee: Deere & Company, Moline, Ill.
[22] Filed: Nov. 10, 1969
[21] Appl. No.: 875,453

[52] U.S. Cl. .................56/14.3, 56/14.6, 56/16.5, 56/16.6
[51] Int. Cl. ..............................A01d 45/02
[58] Field of Search.................56/13.9, 14.3–14.6, 56/13.5, 16.4, 16.5, 16.6; 130/6

[56] References Cited

UNITED STATES PATENTS

| 3,513,646 | 5/1970 | Johnston et al. | 56/16.6 |
| 3,298,162 | 1/1967 | Medd | 56/13.9 |
| 2,467,790 | 4/1949 | Welty | 56/14.3 |

Primary Examiner—Louis G. Mancene
Assistant Examiner—Jack G. Lever, Jr.
Attorney—H. V. Harsha, Harold M. Knoth, William A. Murray and John M. Nolan

[57] ABSTRACT

A total corn plant harvesting machine adapted to separately and concurrently process the grain and stover. In operation, the ears are picked from the stalks, the husks are removed, and the kernels are separated from the cob; the stalks are severed from the ground and fed into a chopping mechanism along with the husks and cobs. The chopped stover can be deposited on the ground or stored in an adjacent container, while the grain can be cracked and mixed with the chopped stover or stored in a separate adjacent container.

17 Claims, 3 Drawing Figures

3,680,291

CORN HARVESTING MACHINE

BACKGROUND OF THE INVENTION

This invention relates generally to crop harvesting machines and more particularly to a corn harvesting machine for separately processing both the grain and stover.

According to a currently common method of harvesting corn, the ears are removed from the stalks and the latter are left in the field along with the cobs and husks. The remaining stover, i.e., stalks, cobs and husks, has commonly been used either for winter beef cow pasturage or as a soil nutrient. In either case, it is generally viewed as nuisance field trash during subsequent tillage and planting operations unless chopped in a separate operation.

In view of the projected increase in the number and size of beef cow herds in the corn belt states, there is an increasing need for more efficient utilization of the entire corn plant. Studies have indicated that the stover can be more efficiently utilized in connection with certain beef cow feeding operations if it is harvested along with the grain. For example, it has been found that under certain conditions harvested stover can be more economically used either as feed, or as bedding in areas where other bedding materials are scarce. The relatively low feed value of stover can be increased as desired by the addition of a grain supplement, such as shelled corn. In connection with the latter, it is well known to crack the kernels prior to their addition to the stover, due to the substantially greater digestibility, and resulting higher feed value, of cracked over uncracked kernels.

Although stover can be harvested with currently available machines, the results obtained are usually of poor quality and the operation is generally expensive and time consuming. For example, a conventional forage harvester or baler with flail-type pickup can be used to harvest stover, though an undesirable quantity of dirt is normally introduced into the harvested material and an additional pass over the field is required under this method. An alternate approach is to adapt a conventional combine to chop the stover simultaneously with the regular combining operation. Although this approach obviates the need for a separate pass, it results in greatly reduced combining capacity due to the additional power requirement of the chopping mechanism. Also, due to the width of the conventional self-propelled combine, it cannot be used to harvest narrow row corn without running over adjacent rows unless it is adapted to receive at least three or four rows. In addition, the conventional rotary cutter used for chopping forage, such as that shown in U.S. Pat. No. 3,377,785 issued April 16, 1968 to Kessler, cannot effectively accommodate more than three rows of corn because of the limited width of its chopping cylinder. The obvious solution, a wider chopping cylinder, is not satisfactory due to the difficult problems of balance and knife construction which arise in the manufacture of such a chopping cylinder, and the resultant increase in cost.

SUMMARY OF THE INVENTION

It is, accordingly, an object of the present invention to provide a corn harvesting machine capable of harvesting the stover in addition to and simultaneously with the grain. It is another object to provide such a machine that can accommodate two or more rows. It is yet another object to provide such a machine which is highly versatile in operation.

The harvesting machine of the present invention includes two separate processing systems, one for grain and the other for stover. The grain system includes a mechanism which first removes the ears from the stalks in a well known manner, then removes the husks from the ears and feeds the latter into a shelling device where the kernels are separated from the cob. Concurrently with the foregoing, the stalks are severed from the ground and fed rearwardly to a chopping mechanism. A pair of transversely aligned, cylindrical chopping cylinders, each capable of accommodating at least two rows of corn in a single pass, are employed. The stalks, along with the cobs and husks, are chopped, then conveyed either to an adjacent container or back to the ground, depending on the preference of the operator. The grain may be either mixed with the chopped stover in the adjacent container, as a feed supplement, or stored in a separate container carried by the machine. A set of adjustable cracking rollers are included to crack the kernels and thereby increase their feed value, if the grain is to be used for feed purposes.

DESCRIPTION OF THE PREFERRED EMBODIMENT

Figure 1:
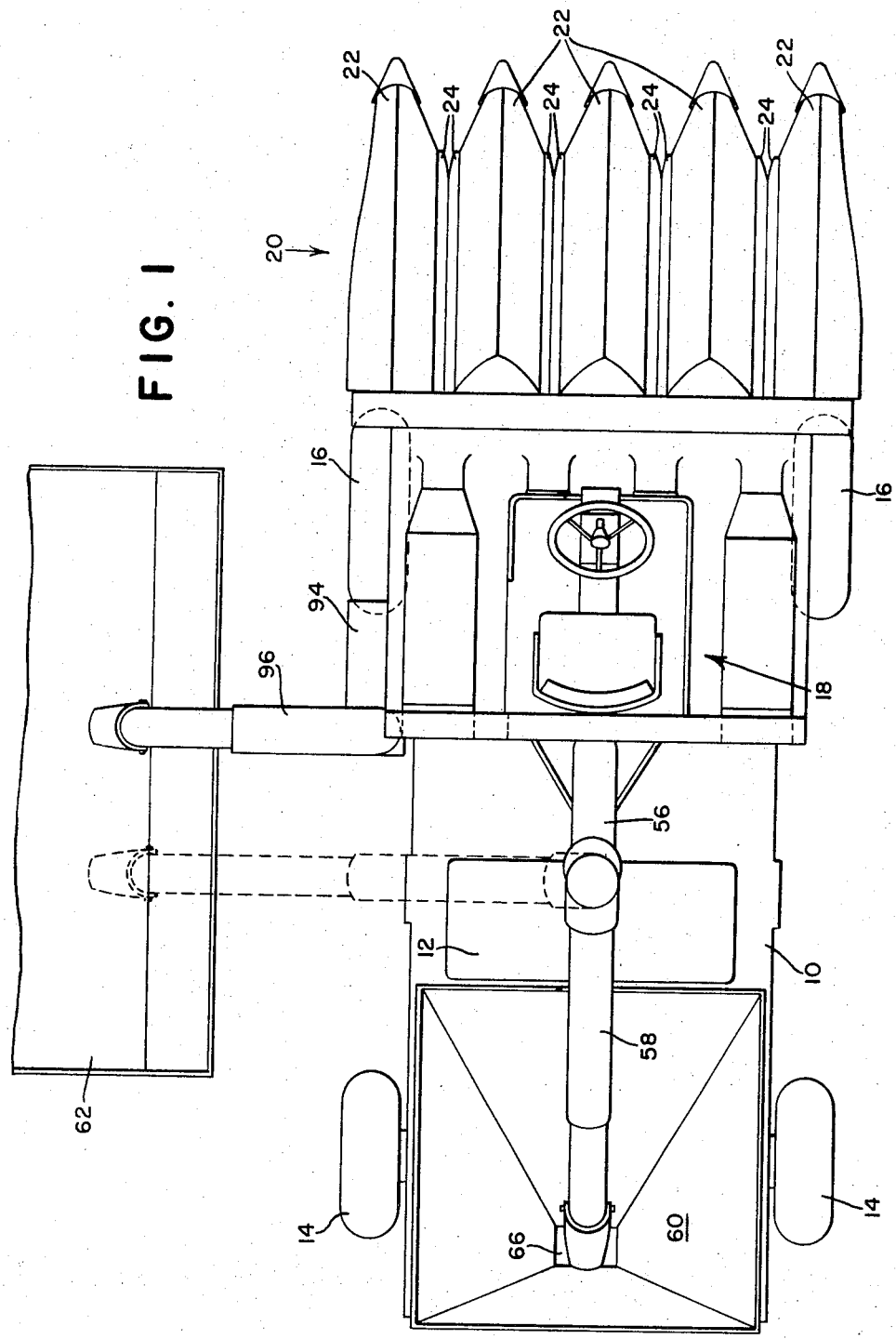
FIG. 1 is a somewhat schematic plan view of the corn harvesting machine of the present invention.

The corn harvesting machine illustrated has a mobile frame 10 supported in a conventional manner on front drive wheels 12 and rear steerable wheels 14. Power is furnished to the front drive wheels and the various operating components of the harvester by an internal-combustion engine 16 carried by the frame intermediate the front and rear wheels. An operator's platform 18 is situated above and slightly behind the front wheels.

A gathering head 20, capable of accommodating four rows of corn, is mounted on the front of the machine and includes five snout portions 22, which define four fore-and-aft passages which respectively receive the corn stalks in four adjacent rows as the machine advances. A pair of snapping rolls 24 are carried between adjacent portions 22 on opposite sides of the passages, and, as the machine advances, the snapping rolls 24 operate in a well known manner to pick the ears from the stalks.

A chain link conveyor 26 receives the ears from the rolls 24 and carries them upwardly and rearwardly to a conventional husking bed 28, which strips the husks from the ears. The husks are discharged into a chute 30 directly below the husking bed, and the stripped ears are deposited into a transverse auger 32, which conveys them to the inlet portion (not shown) of a shelling unit 34. The unit 34 is of more or less conventional design and includes a perforated cylindrical chamber 36 having an ear inlet on one end and a cob discharge 38 on the opposite end. A cylindrical rotor 40, having rigid projections 42 arranged in spiral paths about its outer circumference, is rotatably mounted within the chamber 36. The rotor 40 drives the ears around a spiral path while separating the kernels from the cob.

As they are separated, the kernels fall through the perforations in the wall of the chamber 36 to a receiving trough 44 below the unit 34, and the cobs are carried to the chamber outlet 38 where they are received and conveyed forwardly into chute 30 by an auger 46. The grain collected in the trough 44 falls between front and rear, transverse cracking rollers 48 and 50, respectively, shown in FIG. 2 in their engaged position. The adjustably mounted front roller 48 can be shifted from its engaged position with the rear roller 50 to a disengaged position shown in phantom in FIG. 2, or to any position therebetween. The rollers 48 and 50 are respectively driven in counterclockwise and clockwise directions, as viewed in FIG. 2, and when the roller 48 is in its engaged position, the rollers cooperate to crack and reduce the kernels passing therebetween.

The grain passing through the rollers 48 and 50 is received by a transverse auger 52, which carries it to a central discharge area 54. The discharge area 54 communicates with the lower end portion of a rearwardly inclined elevating auger 56 which elevates the grain to a swingable outlet spout 58 extending outwardly and downwardly from the upper end portion of the auger 56. The spout 58 is swingable on a horizontal shoulder 59 on the upper end of the auger 56, between a rear discharge position, shown in FIGS. 1 and 2, and a side discharge position, shown in phantom in FIG. 1. The grain may thus be directed either to a grain storage tank 60 mounted on the rear of the machine, or to an adjacent wagon 62 moving alongside the machine.

A horizontal discharge auger 64 extends between the lower outlet 66 in the grain tank 60 and the lower inlet portion 67 of the elevating auger 56. When the spout 58 is in its side discharge position, the grain in the tank 60 can thus be removed to an adjacent storage container through the augers 64 and 56.

Shortly after their engagement by the snapping rolls 24, the corn stalks in each fore-and-aft passage are severed from the ground by a conventional reciprocating cutter mechanism 68 disposed rearwardly of the forwardmost portion of each set of snapping rolls. A belt-gathering device 70 in each passage, illustrated best in FIG. 3, engages each corn stalk just before it is severed and conveys the severed stalk rearwardly while the snapping rolls remove the ears. The particular gathering device utilized is illustrated in detail in U.S. Pat. No. 3,339,354 issued Sept. 5, 1967 to Kessler.

Figure 3:
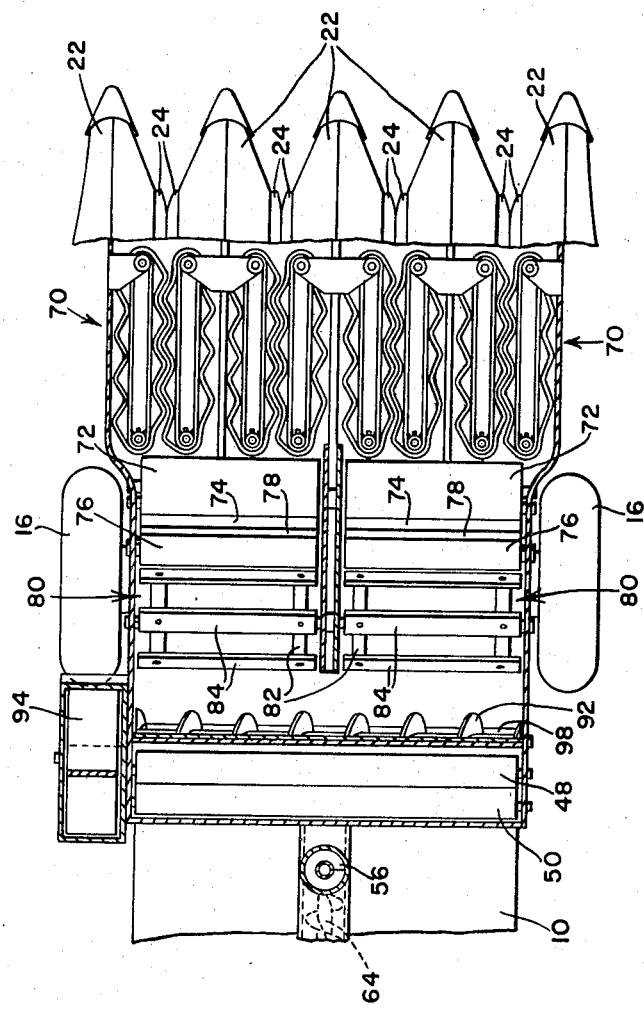
FIG. 3 is a partial section view taken generally along the line 3—3 of FIG. 2.

A forward set of cooperating, axially transverse feed rolls 72 and 74 receive the stalks from two adjacent gathering devices 70 and direct them rearwardly through a rear set of feed rolls 76 and 78 into a chopping unit 80. As shown in FIG. 3, a separate chopping unit and set of front and rear guide rollers is provided on each side of the machine to accommodate the stalks from two rows. Each unit 80 comprises a rotatable chopping cylinder 82 having a plurality of knives 84 affixed to its outer circumference, and a cooperating stationary shear bar 86. Each chopping cylinder 82 is mounted within a housing 88 which collects the chopped material.

Figure 2:
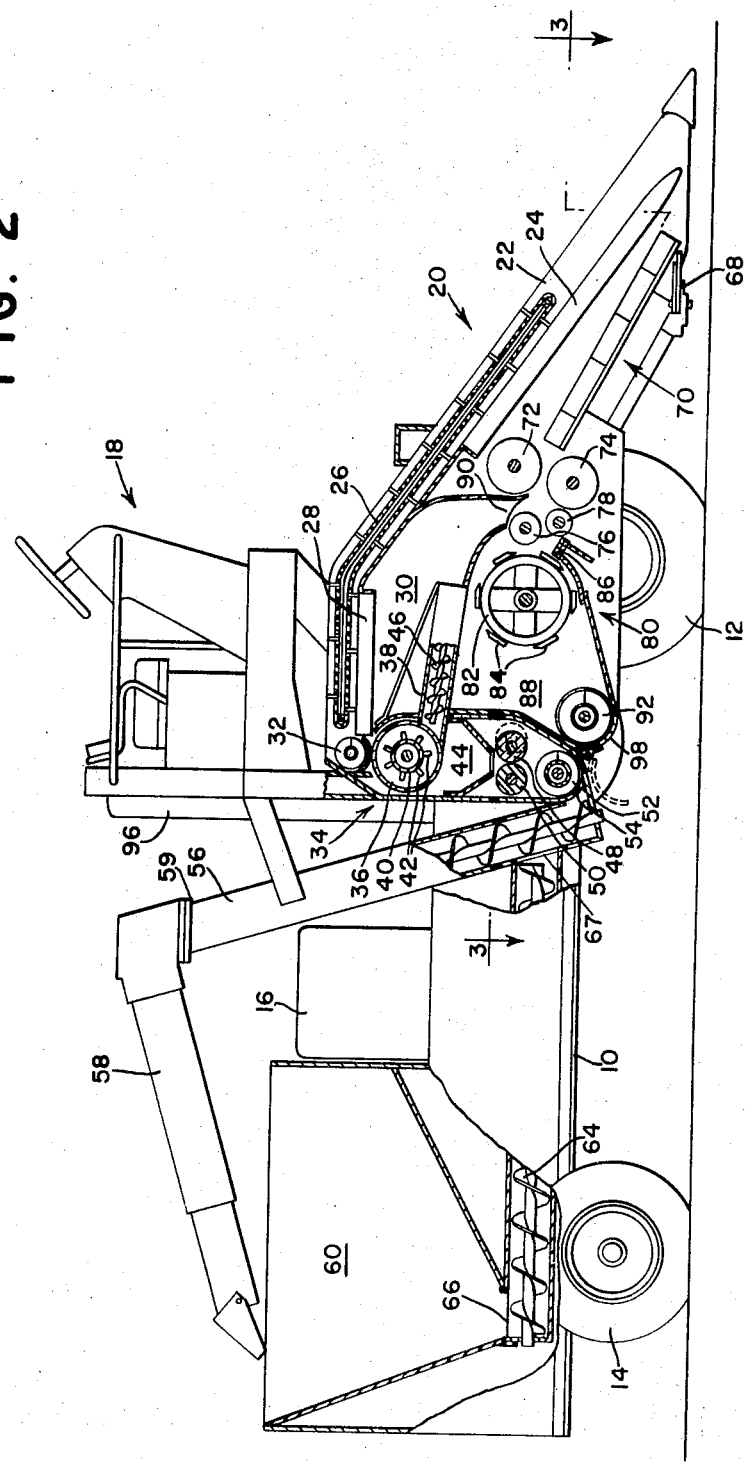
FIG. 2 is a somewhat schematic side view of the machine with portions broken away to more clearly illustrate the harvesting mechanism and grain storage tank.

As shown in FIG. 2, the chute 30, which receives both the husks from the husking rolls 28 and the cobs from the shelling unit 34, has a lower discharge portion 90 which extends between one pair of the upper front and rear feed rolls 72 and 76, respectively. The husks and cobs are thus fed into one of the chopping units 80 along with the stalks.

A transverse auger 92 in the lower rear portion of the housing 88 normally conveys the chopped stover to a side-mounted centrifugal blower 94 which in turn propels it through an upwardly and outwardly extending discharge tube 96 into the adjacent wagon 62. If it is desired instead to return the stover to the ground, a hinged door 98, extending the entire width of the machine beneath the auger 92, may be opened as shown in phantom in FIG. 2.

It should be recognized from the structure described that the present invention is a highly versatile machine, providing the operator with a number of different harvesting options. With the spout 58 directed rearwardly, the cracking rollers 48 and 50 disengaged, and the door 98 closed, the operator can harvest the grain as a cash crop and the stover for use as feed, with or without the subsequent addition of a nutritive supplement, or as bedding material. With the spout 58 directed to the side and the rollers 48 and 50 engaged, the grain can be rolled to improve its digestibility, then added immediately to the stover in the adjacent wagon 62 to improve its feed value. Or, if desired, the machine can be operated more or less as a conventional combine with corn head attachment, if it is desired to harvest none or only a portion of the stover, merely by opening the door 98 beneath the transverse auger 92, thus distributing the chopped stover to the ground. An advantage is realized over the conventional combine in the latter case, however, in that subsequent tillage problems normally arising from the presence of the stover in the field are eliminated without the requirement of a separate chopping operation.

Although the machine illustrated is designed to accommodate four rows of corn, it should be recognized that the provision of two separate chopping units 80 renders the basic machine capable of accommodating up to six rows with the substitution of a higher capacity gathering head 20.

I claim:

1. A corn plant harvesting mechanism comprising: a mobile frame adapted to advance along a row of corn plants; picking means mounted forwardly on the frame for receiving the plants in said row and removing the ears from the stalks; processing means mounted on the frame for receiving the ears from the picking means and removing the kernels from the cobs; means for receiving the kernels from the processing means and selectively operable to crack said kernels; cutting means mounted forwardly on the frame for severing the stalks of the plants in said row from the field; stalk conveyor means for receiving the stalks from the cutting means and conveying them rearwardly substantially simultaneously with the removal of the ears therefrom by the picking means; and chopping means mounted on the frame for receiving the stalks from the conveyor means and reducing said stalks following removal of the ears therefrom by the picking means.

2. The invention defined in claim 1 including husking means mounted on the frame for receiving the ears from the picking means and removing the husks therefrom.

3. The invention defined in claim 2 including husk conveyor means for receiving the husks from the husking means and conveying them to the chopping means to be reduced simultaneously with the stalks.

4. The invention defined in claim 1 including cob conveyor means for receiving the cobs from the processing means and conveying them to the chopping means to be reduced simultaneously with the stalks.

5. The invention defined in claim 1 including means for receiving the reduced stalks from the chopping means and conveying them either to an adjacent first container or to the ground.

6. The invention defined in claim 5 including means for receiving the kernels from the processing means and conveying them either to said first container to be mixed with the reduced stalks or to an adjacent second container.

7. A corn plant harvesting machine comprising: a mobile frame adapted to advance along a row of corn plants; picking means mounted forwardly on the frame for receiving the plants in said row and removing the ears from the stalks; processing means mounted on the frame for receiving the ears from the picking means and removing the kernels from the cobs; cutting means mounted forwardly on the frame for severing the stalks of the plants in said row from the field; stalk conveyor means for receiving the stalks from the cutting means and conveying them rearwardly substantially simultaneously with the removal of the ears therefrom by the picking means; chopping means mounted on the frame for receiving the stalks from the conveyor means and reducing said stalks following removal of the ears therefrom by the picking means; and cob conveyor means for receiving the cobs from the processing means and directing them into the chopping means to be reduced simultaneously with the stalks.

8. The invention defined in claim 7 including husking means mounted on the frame for receiving the ears from the picking means and removing the husks therefrom, and husk conveyor means for receiving the husks from the husking means and directing them into the chopping means to be reduced simultaneously with the stalks and cobs.

9. The invention defined in claim 7 including means selectively operable to crack the kernels after their removal from the cobs by the processing means.

10. The invention defined in claim 7 including means for receiving the reduced stalks and cobs from the chopping means and conveying them to an adjacent first container, and means for receiving the kernels from the processing means and conveying them either to said first container to be mixed with the reduced stalks and cobs or to an adjacent second container.

11. A corn harvesting machine comprising: a mobile frame adapted to advance along a plurality of corn rows; picking means mounted forwardly on the frame for receiving the plants in the rows and removing the ears from the stalks; processing means mounted on the frame for receiving the ears from the picking means and removing the kernels from the cobs; cutting means mounted on the frame for severing the stalks from the ground; chopping means mounted on the frame for receiving the stalks from the cutting means and reducing said stalks after the ears have been removed; stover conveyor means for selectively conveying the chopped material from said chopping means either to an adjacent first container or to the ground; and grain conveyor means for selectively delivering the kernels from the processing means to either said first container to be mixed with the chopped material from the chopping means, or to an adjacent second container.

12. The invention defined in claim 11 wherein said grain conveyor means comprises; an elevating section having an upper outlet portion and a lower inlet portion communicating with said processing means and adapted to receive kernels therefrom; and an outwardly extending discharge section mounted on said upper outlet portion for rotation about a generally vertical axis between alternate discharge positions associated with said first and second containers, respectively.

13. The invention defined in claim 12 wherein said second container includes a lower outlet portion, and further including conveyor means extending between said lower outlet portion and the lower inlet portion of said grain conveyor means, whereby the kernels held in said second container can be selectively conveyed from said container to said grain conveyor means.

14. A corn harvesting machine comprising: a mobile frame adapted to advance along a plurality of corn rows; picking means mounted forwardly on the frame for receiving the plants in the rows and removing the ears from the stalks; processing means mounted on the frame for receiving the ears from the picking means and removing the kernels from the cobs; cutting means mounted on the frame for severing the stalks from the ground; chopping means mounted on the frame for receiving the stalks from the cutting means and reducing said stalks after the ears have been removed therefrom; and conveyor means on said frame selectively operable to convey the kernels and the reduced stalks from the processing means and chopping means, respectively, either to separate areas or to a common container.

15. The invention defined in claim 14 wherein said conveyor means comprises stover conveyor means selectively operable to convey said reduced stalks either to an adjacent first container or to the ground, and grain conveyor means selectively operable to convey said kernels to either said first container to be mixed with said reduced stalks or to an adjacent second container.

16. A corn harvesting machine comprising: a mobile frame adapted to advance along a plurality of corn rows; picking means mounted forwardly on the frame for receiving the plants in the rows and removing the ears from the stalks; processing means mounted on the frame for receiving the ears from the picking means and removing the kernels from the cobs; cutting means mounted on the frame for severing the stalks forming the rows from the field; a pair of transversely aligned chopping cylinders mounted on the machine for reducing the stalks following removal of the ears therefrom by the picking means; conveyor means for receiving the stalks from the cutting means and conveying at least two rows thereof into each of said chopping cylinders to be simultaneously reduced thereby; stover conveyor means for selectively conveying the reduced stalks from the chopping cylinders either to a first container or to the ground; and grain conveyor means for selectively conveying the kernels from the processing means to either said first container to be mixed with the reduced stalks, or to a second container.

17. A corn harvesting machine comprising: a mobile frame adapted to advance along a plurality of corn rows; picking means mounted forwardly on the frame for receiving the plants in the rows and removing the ears from the stalks; processing means mounted on the frame for receiving the ears from the picking means and removing the kernels from the cobs; cutting means mounted on the frame for severing the stalks forming the rows from the field; a pair of transversely aligned chopping cylinders mounted on the machine for reducing the stalks following removal of the ears therefrom by the picking means; stalk conveyor means for receiving the stalks from the cutting means and conveying at least two rows thereof into each of said chopping cylinders to be simultaneously reduced thereby; and cob conveyor means for receiving the cobs from the processing means and directing them into the chopping cylinders to be reduced simultaneously with the stalks.

* * * * *